United States Patent
Zavada et al.

(10) Patent No.: US 9,446,990 B2
(45) Date of Patent: Sep. 20, 2016

(54) CERAMIC INKJET INK FOR RELIEF EFFECT

(71) Applicant: Electronics for Imaging, Inc., Fremont, CA (US)

(72) Inventors: Mark Zavada, Wixom, MI (US); David Weber, Ann Arbor, MI (US); Louis Fage, Livonia, MI (US); Matthew Tennis, Howell, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/333,472

(22) Filed: Jul. 16, 2014

(65) Prior Publication Data

US 2016/0016858 A1    Jan. 21, 2016

(51) Int. Cl.
| | |
|---|---|
| *B28B 1/00* | (2006.01) |
| *C04B 41/86* | (2006.01) |
| *C04B 41/00* | (2006.01) |
| *C04B 41/50* | (2006.01) |
| *B41M 5/00* | (2006.01) |
| *B41M 3/16* | (2006.01) |

(52) U.S. Cl.
CPC ............ *C04B 41/86* (2013.01); *C04B 41/009* (2013.01); *C04B 41/5022* (2013.01); *B41M 3/16* (2013.01); *B41M 5/007* (2013.01); *B41M 5/0047* (2013.01)

(58) Field of Classification Search
None
See application file for complete search history.

(56) References Cited

U.S. PATENT DOCUMENTS

| | | | |
|---|---|---|---|
| 8,609,561 B2 | 12/2013 | Schneider et al. | |
| 2004/0255841 A1* | 12/2004 | Enokido | C30B 7/00 117/2 |
| 2005/0287090 A1 | 12/2005 | Bujard et al. | |
| 2006/0134318 A1 | 6/2006 | Hudd et al. | |
| 2008/0210122 A1 | 9/2008 | Magdassi et al. | |
| 2009/0313906 A1* | 12/2009 | Upadhyay | C09K 3/1409 51/296 |
| 2012/0007930 A1 | 1/2012 | Eron | |
| 2013/0017388 A1 | 1/2013 | Boguslavsky et al. | |
| 2013/0265376 A1 | 10/2013 | Gil-Torrente et al. | |

OTHER PUBLICATIONS

Turner, T. et al., "Chemically Reduced Copper Reds in Oxidation", CeramicsTECHNICAL, No. 35, Nov. 2012; ISSN 1324-1475; <http://search.informit.com.au/documentSummary;dn=918222432372187;res=IELHSS>.

* cited by examiner

*Primary Examiner* — Erica Lin
(74) *Attorney, Agent, or Firm* — Michael A. Glenn; Perkins Coie LLP (57) ABSTRACT

Disclosed are compositions, such as inkjet inks or glazes, for jetting onto a ceramic substrate, and associated methods and systems. The compositions are configured to produce a blister relief effect, wherein the incorporation of inkjet technology provides precise control over the location and degree of blistering. The enhanced compositions are configured to form gas bubbles when exposed to the elevated temperatures of a firing cycle, wherein the formed gas is trapped within the glaze, causing an expansion or blistering of the glaze, which results in a raised relief.

12 Claims, 12 Drawing Sheets

CERAMIC INKJET INK FOR RELIEF EFFECT

FIELD OF THE INVENTION

At least one embodiment of the present invention pertains to inkjet ink compositions that produce gas bubbles when exposed to a firing temperature, causing an expansion or blistering of the composition.

BACKGROUND

Non-uniform textured glazes are known within the traditional ceramic manufacturing community. These textured glazes are manually applied, to produce artistic effects, known as blister, bubble, or lava field effects.

However, traditionally applied textured glazes are not efficiently produced within high volume production environments, and thus, are often not reproduced accurately from one item to another, resulting in differences in one or more portions of the design layout, and/or resulting in differences in the blister effect.

Various effects are currently produced in ceramic inkjet processes by jetting ceramic glaze onto a workpiece, such as a tile, where the glaze a composition for relief, metallic appearance, and/or gloss or matte effects. This results in a relief that is uniform and generally well matched to the under-glaze upon which it is jetted. Such conventional relief methods can be implemented to create patterns and/or enhance printed images, e.g., wood grain.

In the field of inkjet ceramics, options for textured effects at porcelain firing conditions are not currently known to exist.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technique that produces a raised relief or blistering effect for inkjet ceramics to provide, for example, a raised or three-dimensional effect over at least a portion of a ceramic substrate.

In certain embodiments, the technique introduced here involves the following sequence of actions, as described more fully below. Initially, an enhanced composition is provided, which is configured to be jetted onto a ceramic substrate, e.g., a ceramic tile. The composition comprises a carrier compound, and a corresponding reduction agent, which are configured to be jetted onto a ceramic substrate, i.e., a workpiece. In some embodiments, the carrier compound comprises silicon carbide (SiC). The reduction agent reacts with a reactive gas, e.g., oxygen, nitrogen, or both, during the firing of the ceramic workpiece, to produce gas bubbles within the composition, causing a three-dimensional effect to be produced on the ceramic substrate. At least some of the bubbles or physical effects thereof remain in the composition after the composition cools to room temperature.

The oxygen or the nitrogen can be present in the carrier compound, the reduction agent, or both, such as within a reactive gas constituent, and/or can be ambient in a kiln in which the ceramic substrate is to be fired.

In some embodiments, the enhanced composition can be jetted onto the ceramic substrate either before or after other inks or glazes are applied to the ceramic substrate. For instance, in some embodiments, the enhanced composition can be jetted onto the ceramic substrate either before or after a ceramic glaze is jetted onto the ceramic substrate.

Figure 1:
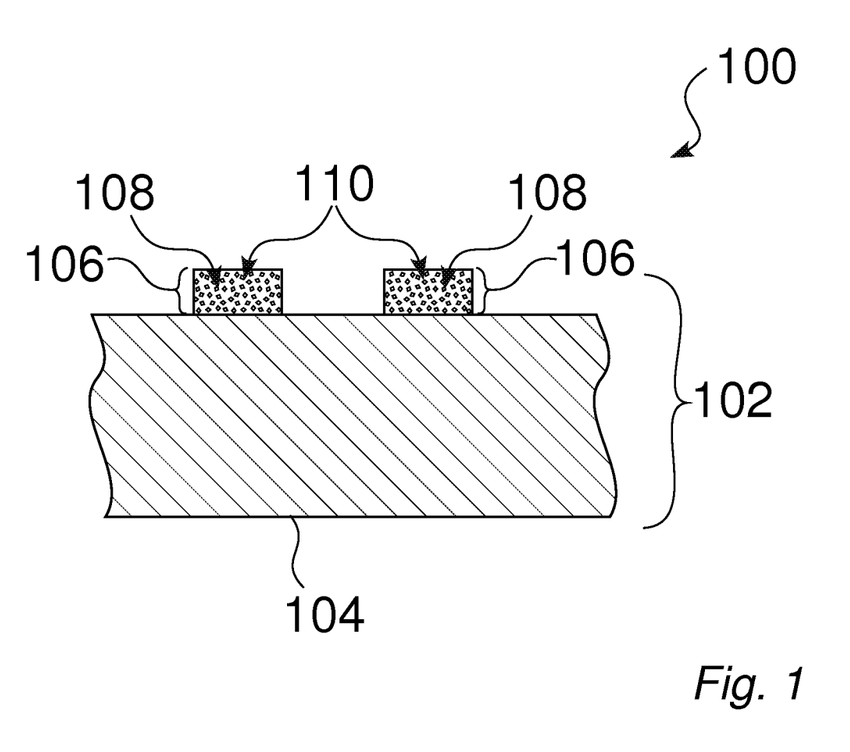
FIG. 1 illustrates an embodiment of an enhanced composition that is jetted onto a ceramic substrate, wherein the enhanced composition comprises a carrier compound and a reduction agent.
Figure 2:
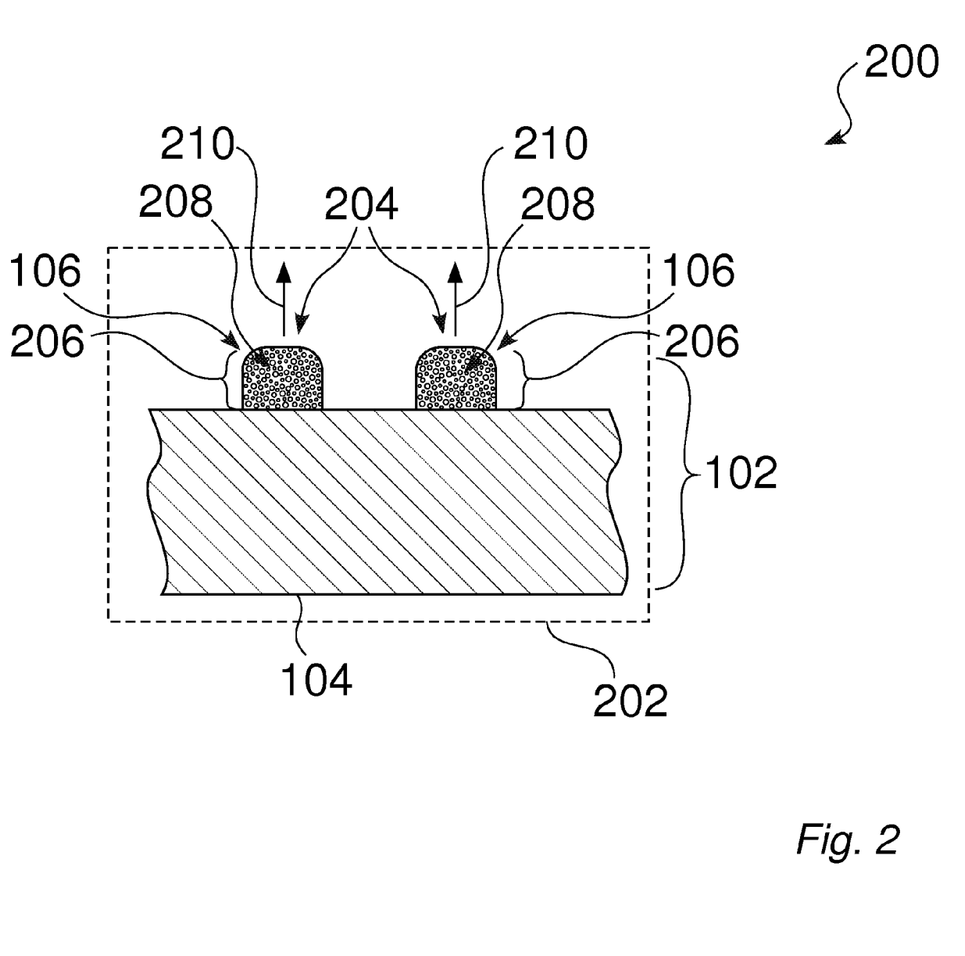
FIG. 2 is a schematic diagram of an enhanced composition on a ceramic substrate, wherein the resultant ceramic workpiece is exposed to a firing temperature, and wherein the reduction agent reacts with a reactive gas to cause a reduction reaction that produces gas bubbles in the fired composition.
Figure 3:
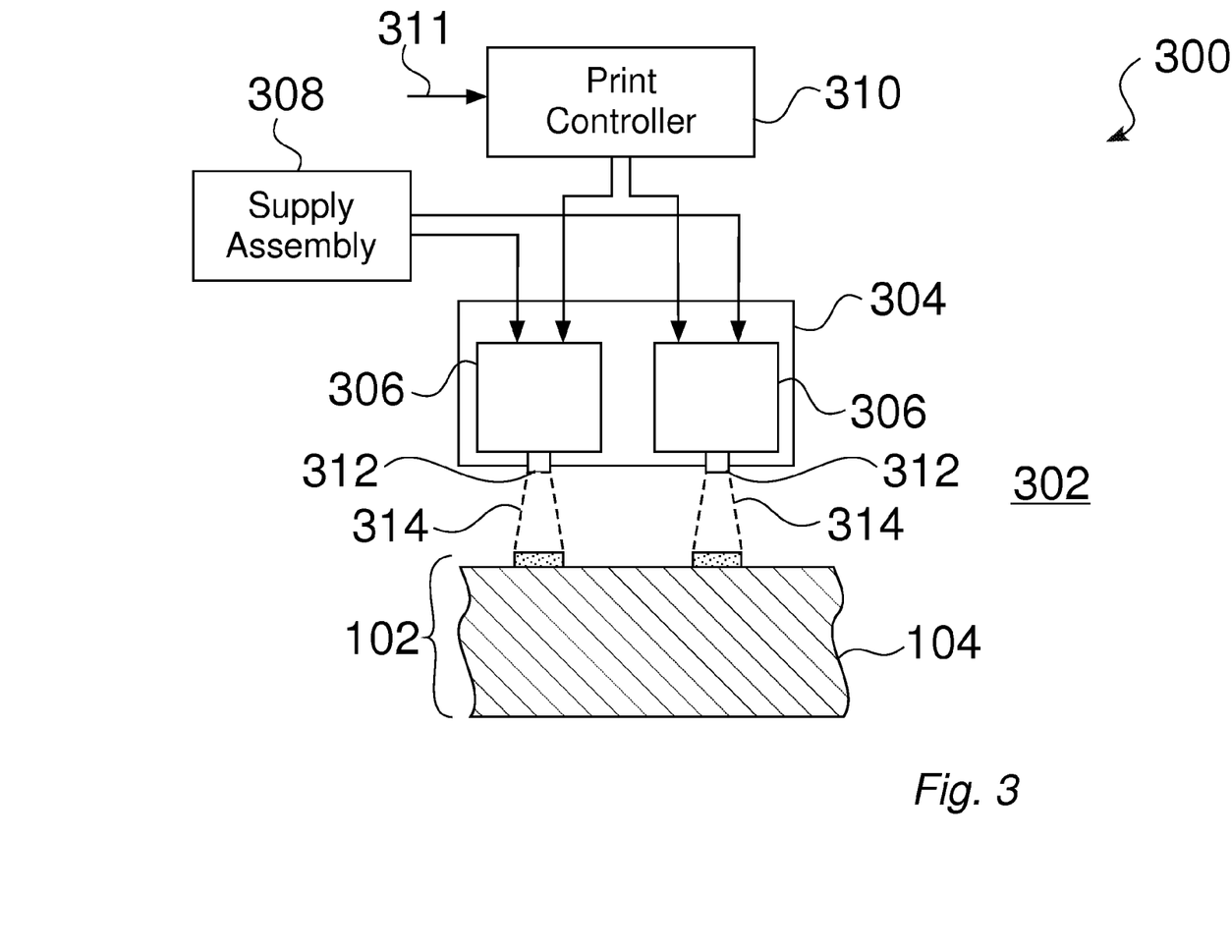
FIG. 3 is a schematic diagram of a printing environment for jetting a composition onto a ceramic workpiece, wherein the composition comprises a carrier compound and a reduction agent.

FIG. 1 illustrates an embodiment 100 of an enhanced composition 106, e.g., an inkjet ink or glaze, on a ceramic substrate 104, wherein the enhanced composition 106 comprises a carrier compound 108 and a reduction agent 110. The composition 106 can be jetted 314 (FIG. 3), 502 (FIG. 5) onto the ceramic substrate 104, such as by one or more print heads 306 (FIG. 3). The ceramic workpiece 102 is subsequently fired, causing a reduction reaction 204 (FIG. 2) between the reduction agent 110 and a reactive gas 408 (FIG. 4), to cause gas bubbles 208 (FIG. 2) to be formed, creating a blistering effect 210 (FIG. 2). The reactive gas 408, e.g., oxygen or nitrogen, can be present in the carrier compound 108, the reduction agent 110, or both, such as within a reactive gas constituent 1012 (FIG. 10), and/or is ambient in a kiln 404 (FIG. 4) in which the ceramic workpiece 102 is to be fired 504 (FIG. 5).

While the substrate 104 is generally described herein as a ceramic substrate 104, it should be understood that the technique can be suitably adapted for a wide variety of workpieces 104 that can be fired, e.g., tiles such as ceramics, which can be manufactured from clay, minerals and water, or porcelain, which can be manufactured from finely ground sand.

In some embodiments, the carrier compound 108 comprises water. In an embodiment of the enhanced composition 106, the reduction agent 110 is chosen to produce gas bubbles 208 for a blistering effect 210, such as based on the other constituents in the enhanced composition 106, the firing process 504, and/or the heating environment 404 to be used. In some embodiments of the enhanced composition 106, the reduction agent 110 can comprise any of SiO, SiC, SiN, or BN.

For instance, silicon carbide (SiC) is one such material capable of undergoing the chemical reaction required to produce the blistering effect 210. SiC provides a very hard performance material, with high chemical and temperature resistances.

At the required kiln temperatures for ceramic processes, and in the presence of oxygen, SiC breaks down into silicon dioxide ($SiO_2$), a primary component already present in glaze formulations, and carbon dioxide gas ($CO_2$). In this example, the creation of carbon dioxide gas bubbles 208 causes the blister effect 210, upon the application of sufficient heat. This exemplary reaction is shown as:

$$SiC + 2O_{2(gas)} \rightarrow SiO_2 + CO_{2(Blister\ Effect)}. \quad (1)$$

In some embodiments, the enhanced jettable composition 106 comprises an inkjet ink, which can be jetted onto the ceramic substrate 104, on its own, or before and/or after a glaze, e.g., 802, 804 (FIG. 8) is applied to a ceramic substrate 104. The amount of the enhanced composition 106 jetted onto the ceramic substrate 104 can control the magnitude of the blistering effect 210.

FIG. 2 is a schematic diagram 200 of an enhanced composition 106 (FIG. 1) on a ceramic substrate 102, wherein the workpiece 102 is exposed to a firing temperature 202, and wherein the reduction agent 110 reacts with a reactive gas 408 (FIG. 4), e.g., oxygen, nitrogen, or both, to produce gas bubbles 208 within the composition 106, causing a three-dimensional effect 210 to be produced on the ceramic substrate 104. The reactive gas 408 can be present in the carrier compound 108, the reduction agent 110, or both, such as within a reactive gas constituent 1012 (FIG. 10), and/or can be ambient in a kiln 404 (FIG. 4) in which the ceramic substrate 104 is to be fired.

Figure 10:
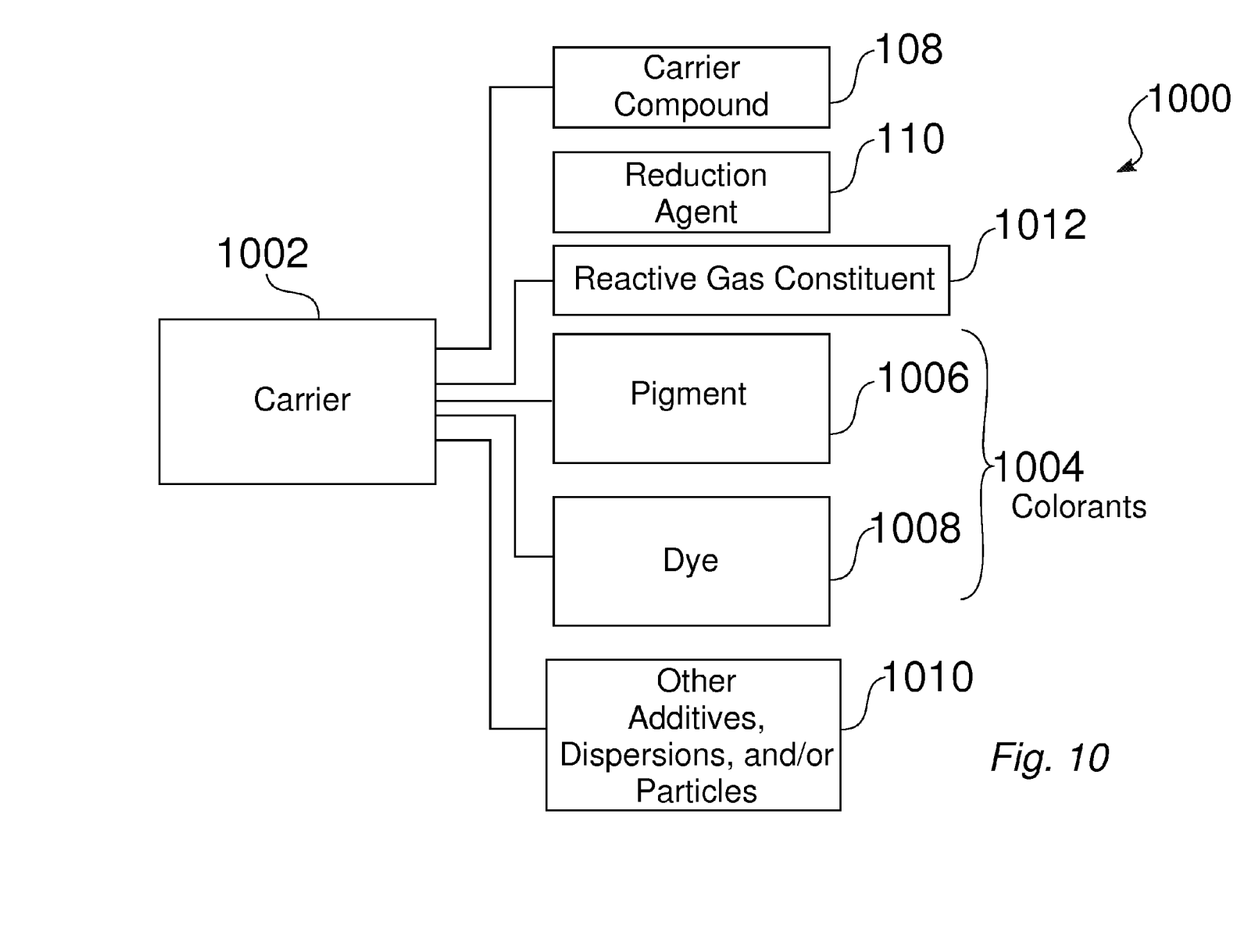
FIG. 10 is a schematic block diagram of components that can be included in some embodiments of the enhanced composition.

The substrate 104 can comprise a variety of ceramics 104 that can be fired in any temperature range that corresponds to the reduction reaction 204. In some embodiments of the enhanced composition 106, the firing temperature 202, as when controlled within a kiln 404 (FIG. 4) has a range of 1050 degrees C. to 1300 degrees C. The jetted composition 106 on the ceramic substrate 104 can form a glaze 206 as a result of the firing 504 (FIG. 5). The specific production of gas bubbles 208 and the blistering effect 210 can depend on a variety of operational parameters, e.g., specific temperatures, firing schedules, temperature ramping, down-firing, etc., and/or the use of one or more additional constituents in the composition 106, such as pigments 1006 (FIG. 10), dyes 1008 (FIG. 10), and/or other additives, dispersions, or particles 1010 (FIG. 10).

FIG. 3 is a schematic diagram 300 of an printing system 302 for jetting 314 a composition 106 onto a ceramic workpiece 104, wherein the composition 106 comprises a carrier compound 108 and a reduction agent 110. The printing system 302 seen in FIG. 3 includes a print head assembly 304, comprising one or more print heads 306 having corresponding jets 312. A supply assembly 308 is connected to the print heads 306, whereby the composition 106 can be transferred to the print heads 306, for jetting 314 onto a ceramic substrate 104, such as controlled by a print controller 310, typically in response to a received print job 311.

In operation, the printing system 302 allows precise control over the location of the jetted composition 106, the reduction reaction 204, the production of gas bubbles 208, and the resultant blistering effect or raised relief 210, such as to provide a random digital technique for three-dimensional texturing or blistering 210.

Figure 4:
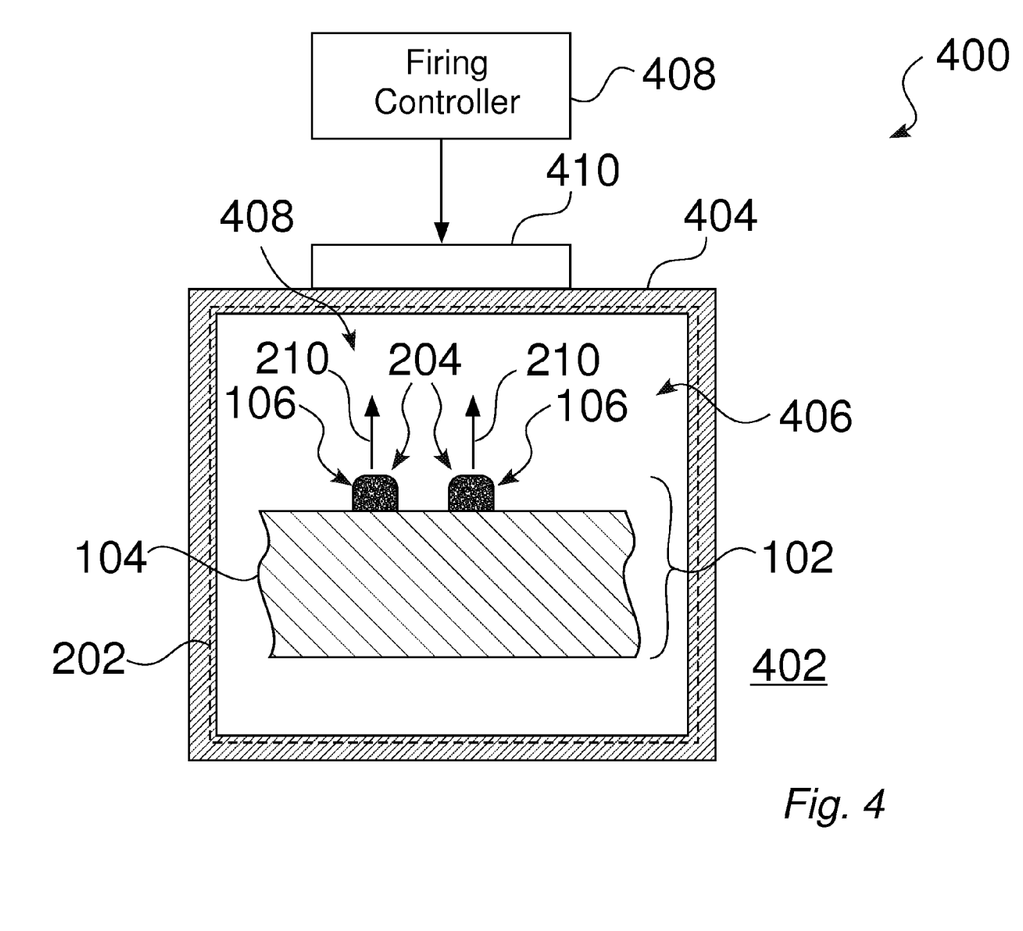
FIG. 4 is a schematic diagram of a system for heating a ceramic workpiece having a jetted composition, wherein, when exposed to the heat, the reduction agent and a reactive gas react to produce bubbles in the heated composition.
Figure 5:
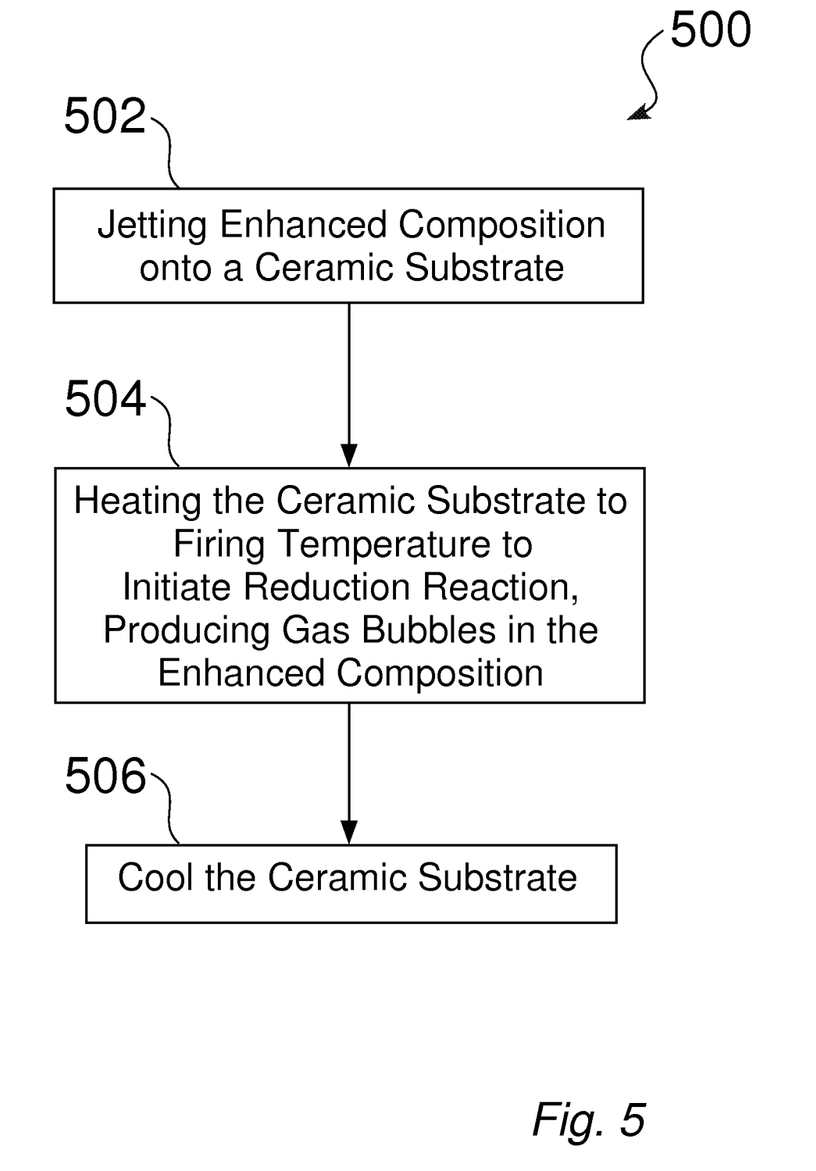
FIG. 5 is a flowchart of a method for producing a ceramic workpiece having an enhanced composition that produces gas bubbles when heated for a blistering effect.

FIG. 4 is a schematic diagram 400 of a firing system 402 for heating a ceramic workpiece 102 having a jetted composition 106 (FIG. 3), wherein when exposed to sufficient heat, the reduction agent 110 reacts with a reactive gas 408 408, e.g., oxygen, nitrogen, or both, to produce gas bubbles 208 within the composition 106, causing a three-dimensional effect 210 to be produced on the ceramic substrate 104. The reactive gas 408 can be present in the carrier compound 108, the reduction agent 110, or both, and/or can be ambient in the kiln 404 in which the ceramic substrate 104 is to be fired 504 (FIG. 5).

The kiln 404 seen in FIG. 4 has an interior 406 defined therein, and a heating system 410, such as under control of a firing controller 408, wherein the heating system 410 comprises a heat source, and can additionally comprise a mechanism for air circulation, e.g., a fan. The firing system 402 is operable to heat the jetted ceramic workpiece 102 to a firing temperature 202, such as greater than 1000 degrees C., or within a temperature range, e.g., 1050 degrees C. to 1300 degrees C., to produce gas bubbles 208 within the composition 106, causing a three-dimensional effect 210 to be produced on the ceramic substrate 104. At least some of the bubbles 208 or physical effects 210 thereof remain in the composition 106 after the composition 106 cools to room temperature. As well, the jetted composition 106 on the workpiece 102 can form a glaze 206 (FIG. 2) as a result of the firing 504.

FIG. 5 is a flowchart of a method 500 for producing an enhanced ceramic workpiece 102. The method 500 comprises jetting 502 an enhanced composition 106 onto a ceramic substrate 104, wherein the enhanced composition 106 comprises a carrier compound 108 and a reduction agent 110. The jetted ceramic workpiece 102 is then heated to a firing temperature 202, to initiate a reduction reaction 204 between the reduction agent 110 and a reactive gas 408, causing gas bubbles 208 to be produced in the enhanced composition 106, wherein the gas bubbles 208 can be trapped within the enhanced composition 106, producing a blistering effect 210. The ceramic workpiece 102 is then cooled 506, wherein at least some of the bubbles 208 or physical effects 210 thereof remain in the composition 106 after the composition 106 cools to room temperature.

In some embodiments of the technique, the carrier compound 108 and the reduction agent 110 can be supplied as a single composition 106, such as within an appropriate jettable carrier 1002 (FIG. 10), e.g., water, whereby the carrier compound 108 and the reduction agent 110 are jetted 502 concurrently onto the ceramic substrate 104. However, other embodiments of the technique allow separate jetting of a carrier compound 108 and the reduction agent 110, as long as the reduction agent 110 comes into contact the reactive gas 408 during the heating 504, to initiate the reduction reaction 204 between the reduction agent 110 and the reactive gas 408. In such embodiments, the reduction agent 110 may be jetted within its own carrier 1002 (FIG. 10).

Figure 6:
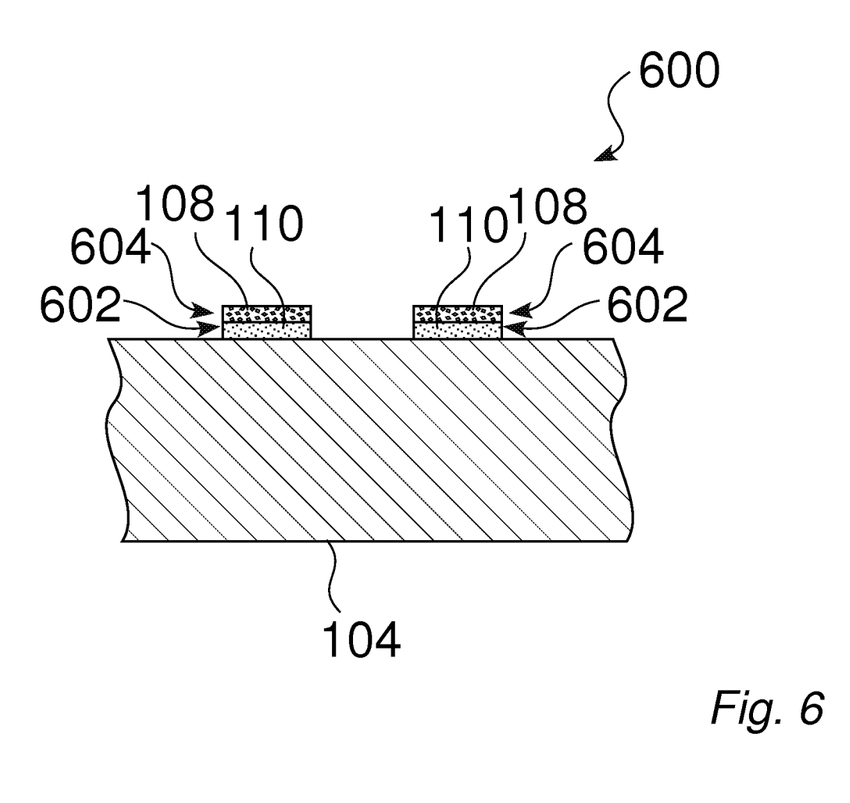
FIG. 6 illustrates an embodiment of an enhanced composition on a ceramic substrate, comprising a reduction agent layer jetted onto the ceramic substrate, and an additional layer, including a carrier compound, jetted onto the reduction agent layer.

For example, FIG. 6 illustrates an embodiment 600 of an enhanced composition 106 on a ceramic substrate 104, wherein the enhanced composition 106 comprises a layer 602 of reduction agent 110 that is jetted 502 onto the ceramic substrate 104, and an additional layer 604, including a carrier compound 108, which is jetted 502 onto the jetted layer 602 of the reduction agent 110.

Figure 7:
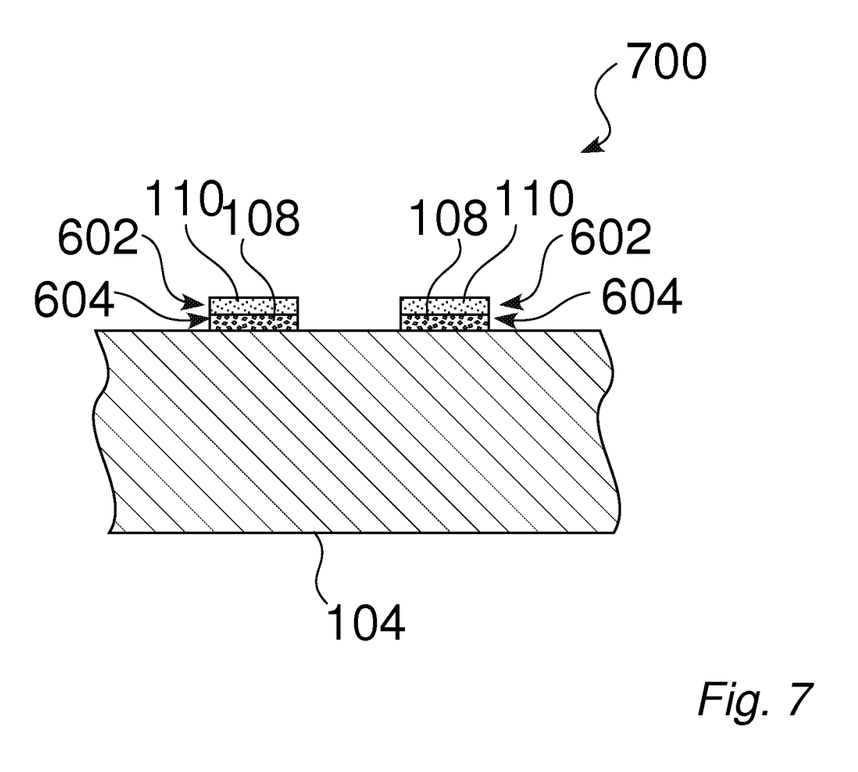
FIG. 7 shows an embodiment of an enhanced composition on a ceramic substrate, comprising a first layer including a carrier compound jetted onto the ceramic substrate, and a reduction agent layer jetted onto the first layer.

As a further example, FIG. 7 shows an embodiment 700 of an enhanced composition 106 on a ceramic substrate 104, wherein the enhanced composition 106 comprises a layer 604, including a carrier compound 108, which is jetted 502 onto the ceramic substrate 104, and a layer 602 of reduction agent 110 that is jetted 502 onto the jetted layer 604.

Figure 8:
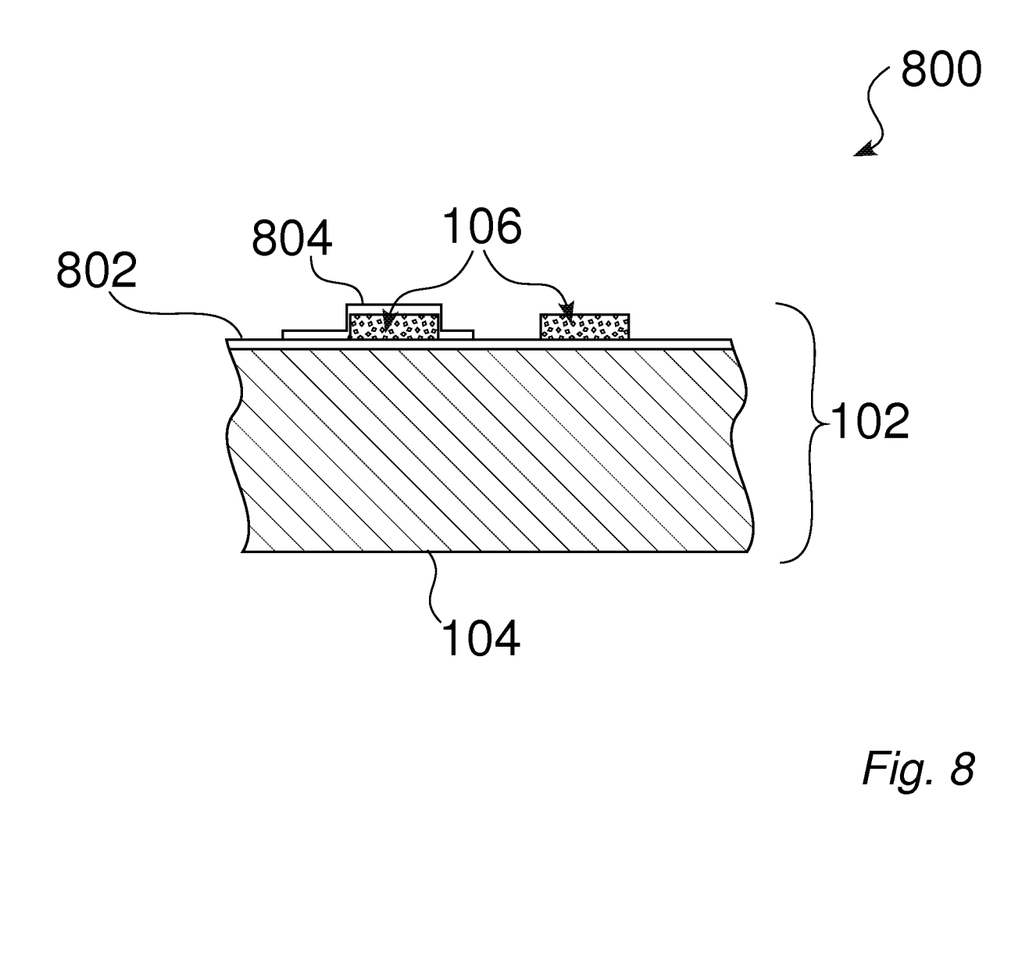
FIG. 8 illustrates an alternate embodiment of an enhanced composition on a ceramic substrate, which can include one or more jetted layers below and/or above the composition.

FIG. 8 illustrates an alternate embodiment 800 of an enhanced composition 106 on a ceramic substrate 104, which can include one or more jetted layers below 802 and/or above 804 the composition 106. For example, a jetted lower layer 802 can comprise any of a glaze, primer, a basecoat, and/or one or more jetted colors. Similarly, a jetted upper layer 804 may comprise one or more jetted clear, translucent or opaque color layers, e.g., glazes, over at least a portion of the jetted composition 106. In some embodiments of the technique, the additional layers 802 and 804 are jetted by one or more print heads 306 of the printing system 302.

Figure 9:
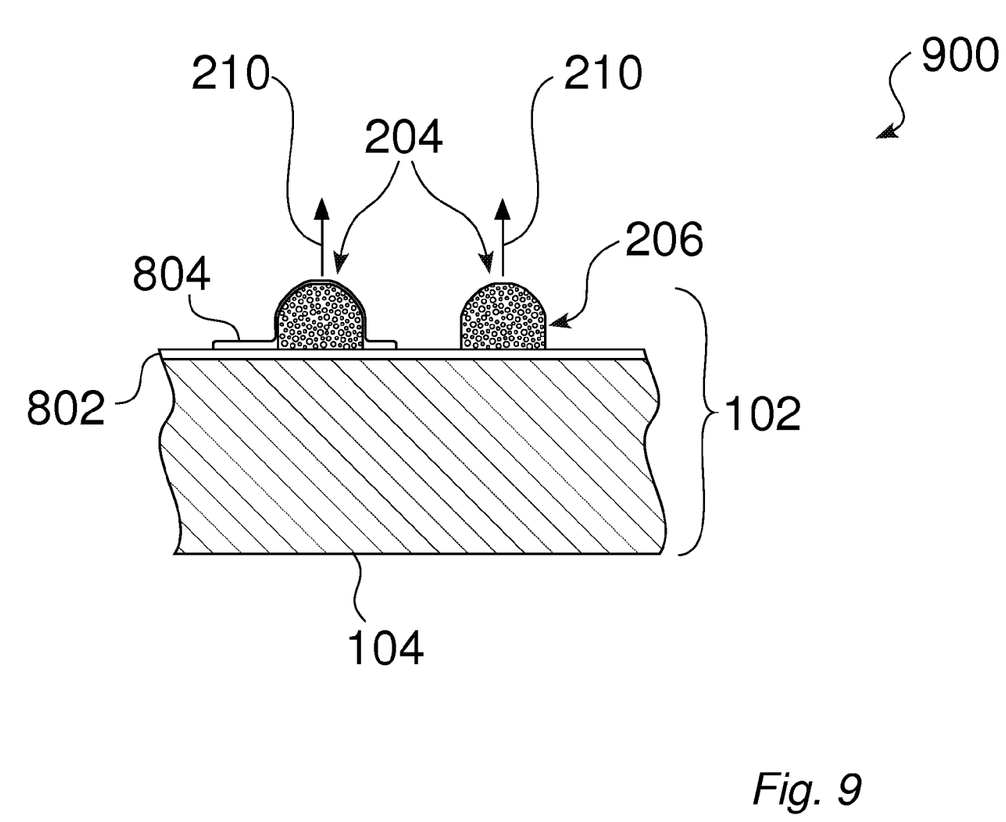
FIG. 9 shows the alternate embodiment of FIG. 8 after firing, wherein gas bubbles produced in the heated enhanced composition form a raised relief.

FIG. 9 provides an illustrative 900 of the embodiment of FIG. 8 after firing 504, wherein gas bubbles 208 produced in the fired composition 206 form one or more raised reliefs 210. As also seen in FIG. 9, the raised reliefs 210 can be at least partially covered by an outer jetted layer 804, e.g., an outer glaze, or can be uncovered.

FIG. 10 is a schematic block diagram 1000 of components that can be included in some embodiments of the enhanced composition 106. As discussed above, the carrier compound 108 and the reduction agent 110 can be supplied as a single composition 106, such as with an appropriate carrier 1002. The combined composition 106 can further comprise further components, such as any of colorants 1004, e.g., pigments 1006 and/or dyes 1008, or other constituents, such as reactive gas constituents 1012, i.e., sources for the reactive gas 408, or additives, dispersions, and/or jettable particles 1010.

As also discussed above, some embodiments of the technique allow for separate jetting of the carrier compound 108 and the reduction agent 110, whereby both the carrier compound 108 and the reduction agent 110 are supplied as jettable compositions, e.g., each within a corresponding carrier 1002. One of or both the carrier compound 108 and the reduction agent 110 can also comprise further components, such as any of colorants 1004, e.g., pigments 1006 and/or dyes 1008, or other constituents, such as reactive gas constituents 1012, i.e., sources for the reactive gas 408, or additives, dispersions, and/or jettable particles 1010.

Figure 11:
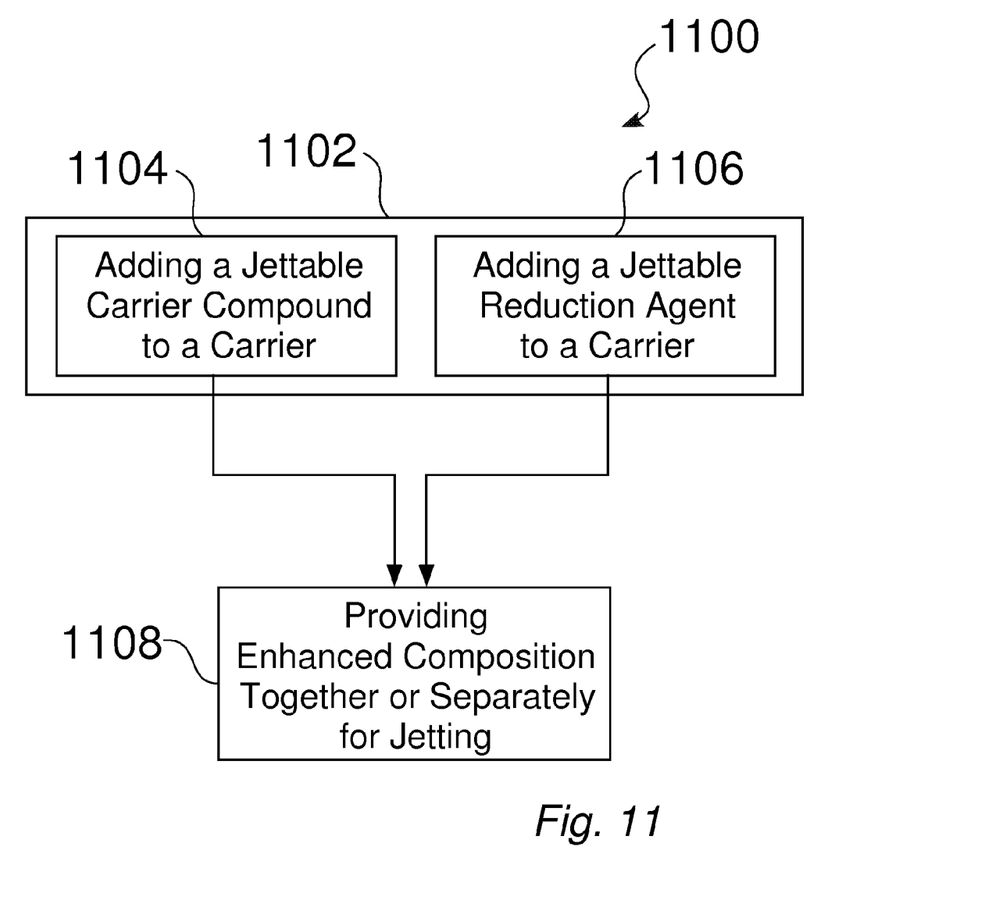
FIG. 11 is a flowchart of a method for manufacturing a jettable enhanced composition for producing a blistering effect on a ceramic substrate.

FIG. 11 is a flowchart of a method 1100 for manufacturing an enhanced composition 106 for jetting 502 onto a ceramic substrate 104. As seen in FIG. 11, the manufacture 1102 can comprise adding 1104 a jettable carrier compound 108 to a carrier 1002, such as water. The manufacturing method 1100 seen in FIG. 11 also comprises adding 1106 a jettable reduction agent 110 to either its own carrier 1002, or to the carrier 1002 for the carrier compound 108. The manufactured composition 106 is then typically packaged, distributed, delivered and stored 308 (FIG. 3), as either a combined composition 106, or as separate carrier and reduction agent solutions, for jetting 502 and curing 504, to produce raised relief or blistering effects 210 on ceramic substrates 104, wherein reduction agent 110 reacts with a reactive gas 404 to produce gas bubbles when heated to a firing temperature of the ceramic substrate. In some embodiments, the reduction agent 110 comprises any of SiO, SiC, SiN, or BN, or any combination thereof.

The carrier 1002 for the reduction agent 110 can be a separate carrier 1002 than that used for the carrier compound 108, such as for independent jetting 502 of layers 602,604 (FIG. 6, FIG. 7). In some embodiments, the jettable reduction agent 110 is added to the same carrier 1002 as that used for the jettable carrier compound 108, such as to provide concurrent jetting 502 of the enhanced composition 106. Once prepared, the enhanced composition 106, comprising either a single composition 106, or separate jettable components 108, 110, is typically provided for use by the printing system 302 (FIG. 3).

Figure 12:
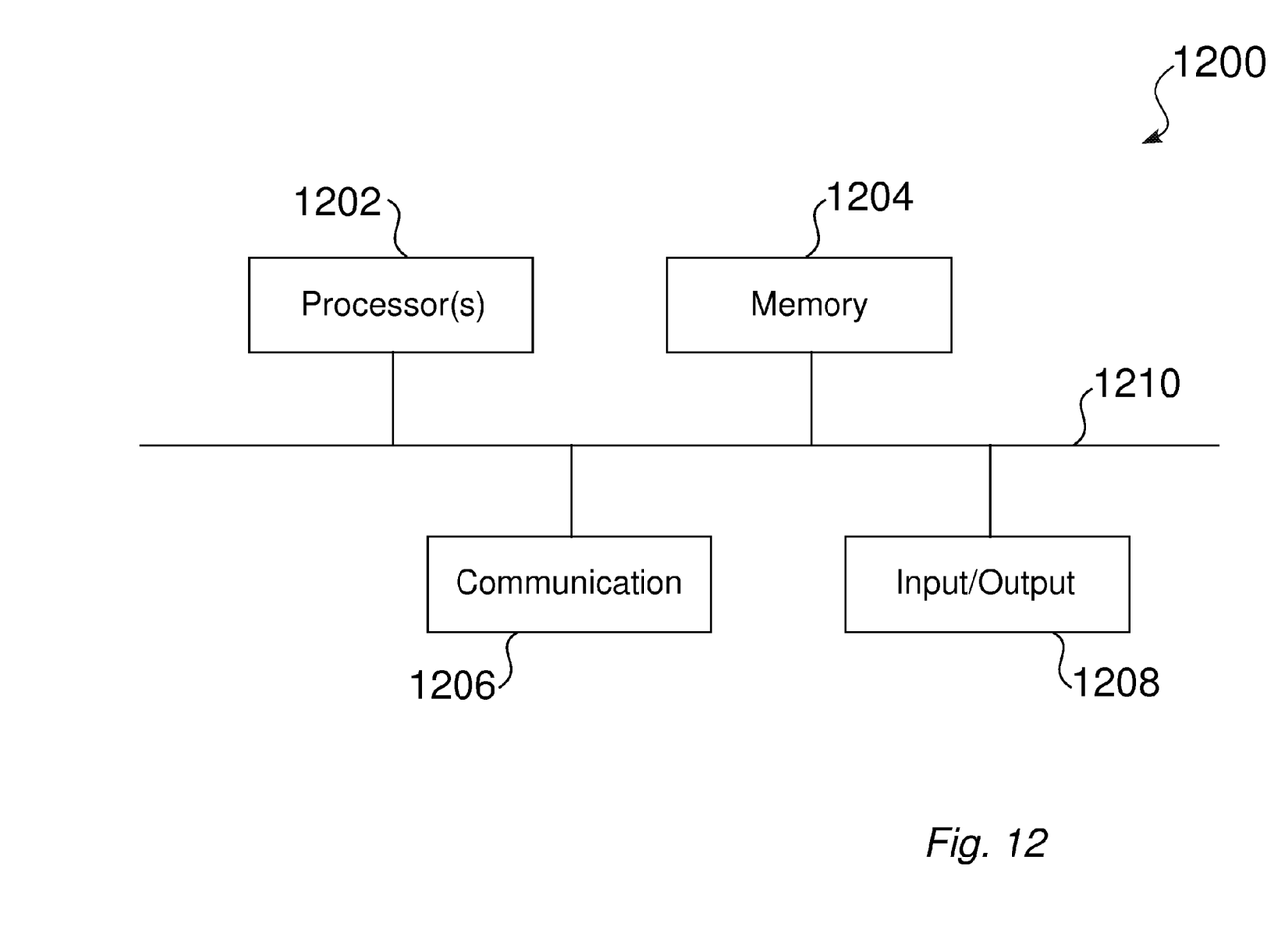
FIG. 12 is a high-level block diagram showing an example of a processing device that can represent any of the systems described herein.

FIG. 12 is a high-level block diagram showing an example of a processing device 1200 that can represent any of the systems described above, such as the printing system 302, the firing system 402, or a system for manufacturing the enhanced composition 106. Any of these systems may include two or more processing devices such as represented in FIG. 12, which may be coupled to each other via a network or multiple networks.

In the illustrated embodiment, the processing system 1200 includes one or more processors 1202, memory 1204, a communication device 1206, and one or more input/output (I/O) devices 1208, all coupled to each other through an interconnect 1210. The interconnect 1210 may be or include one or more conductive traces, buses, point-to-point connections, controllers, adapters and/or other conventional connection devices. The processor(s) 1202 may be or include, for example, one or more general-purpose programmable microprocessors, microcontrollers, application specific integrated circuits (ASICs), programmable gate arrays, or the like, or a combination of such devices. The processor(s) 1202 control the overall operation of the processing device 1200. Memory 1204 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1204 may store data and instructions that configure the processor(s) 1202 to execute operations in accordance with the techniques described above. The communication device 1206 may be or include, for example, an Ethernet adapter, cable modem, Wi-Fi adapter, cellular transceiver, Bluetooth transceiver, or the like, or a combination thereof. Depending on the specific nature and purpose of the processing device 1200, the I/O devices 1208 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The jetting, firing, and/or manufacturing techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media, e.g., read-only memory (ROM); random access memory (RAM); magnetic disk storage media; optical storage media; flash memory devices; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising: jetting a carrier compound onto a ceramic substrate; and heating a composition that includes the carrier compound and a reduction agent to a temperature at which the reduction agent produces gas bubbles within the composition; wherein the gas bubbles cause the heated composition to rise, producing a raised relief on the ceramic substrate; and wherein the raised relief remains after the composition cools to room temperature, wherein the temperature at which the reduction agent produces gas bubbles within the composition has a range of 1050 degrees C. to 1300 degrees C.

2. The method of claim 1, further comprising:
   combining the carrier compound with the reduction agent to form the composition, wherein the combining step is performed before the jetting step, and wherein the jetting step comprises the jetting of the composition onto the ceramic substrate.

3. The method of claim 1, further comprising:
   jetting the reduction agent onto the ceramic substrate before the jetting of the carrier compound.

4. The method of claim 1, further comprising:
   jetting the reduction agent onto the ceramic substrate after the jetting of the carrier compound.

5. The method of claim 1, wherein the composition comprises a ceramic glaze.

6. The method of claim 5, wherein the reduction agent comprises any of SiO, SiC, SiN, or BN.

7. The method of claim 1, further comprising:
   controlling the amount of the reduction agent in the composition to vary the production of the gas bubbles.

8. The method of claim 1, wherein the gas bubbles comprise carbon dioxide.

9. The method of claim 1, wherein the ceramic substrate includes a jetted layer applied thereon, and wherein the composition that includes the carrier compound and the reduction agent are located on top of the jetted layer.

10. The method of claim 9, wherein the jetted layer comprises any of a glaze, a primer, a basecoat, or a colored layer.

11. The method of claim 1, further comprising:
    jetting an upper layer over at least a portion of the compound before the heating.

12. The method of claim 11, wherein the upper layer includes any of a clear layer, a translucent layer, or an opaque layer.

* * * * *